April 11, 1961 F. HAALCK 2,978,906
GRAVIMETERS
Filed April 14, 1958 3 Sheets-Sheet 1

INVENTOR
Fritz Haalck
BY

ATTORNEY

April 11, 1961 F. HAALCK 2,978,906
GRAVIMETERS
Filed April 14, 1958 3 Sheets-Sheet 2
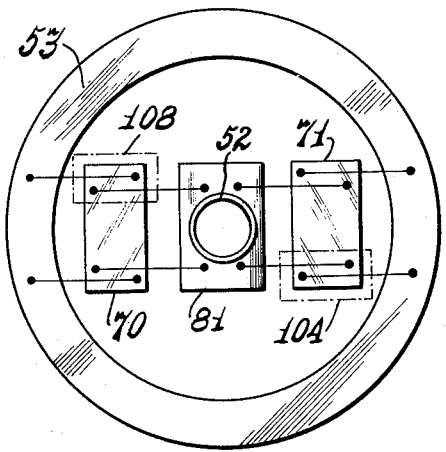
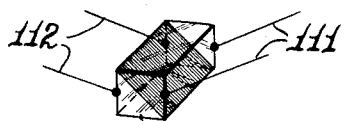
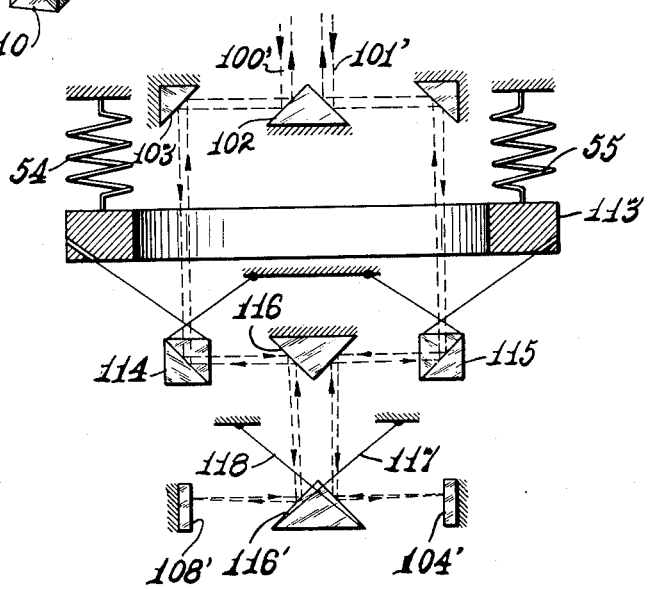
INVENTOR
Fritz Haalck
BY
ATTORNEY April 11, 1961 F. HAALCK 2,978,906
GRAVIMETERS
Filed April 14, 1958 3 Sheets-Sheet 3
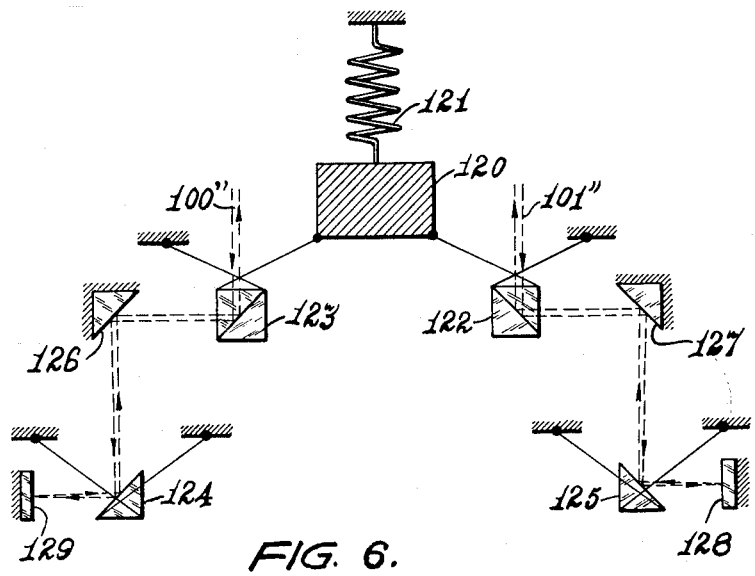
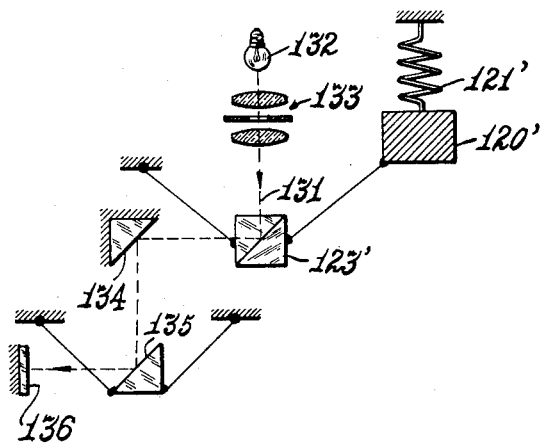
INVENTOR
*Fritz Haalck*
BY
ATTORNEY United States Patent Office 2,978,906
Patented Apr. 11, 1961

2,978,906

GRAVIMETERS

Fritz Haalck, Berlin-Wilmersdorf, Germany, assignor to Askania-Werke A.G., Berlin-Friedenau, Germany, a corporation of Germany Filed Apr. 14, 1958, Ser. No. 728,438

Claims priority, application Germany Apr. 2, 1958

2 Claims. (Cl. 73—382)

This invention relates to gravimeters. It provides novel means for solving the peculiar problem of such instruments, that is, for measuring with high sensitivity any changes in the mechanical force of gravity, while at the same time providing substantial non-sensitivity for other forces, including mechanical forces very similar to those to be measured.

It is known that a solution and particularly a reliable, durable and relatively economical solution of the problem is relatively simplified by using that form of a gravimeter wherein the gravimeter mass is supported in a basically static way on spring scale means elastically displaceable in response to changes in the force of gravity acting on the mass. In gravimeters of this type it is generally desirable to use every available expedient for amplifying the minute displacement of the mass caused by a small change of gravity; and for this reason it has been proposed to provide means so associated with the indicator means as to exert, while indicating the displacement of the mass, a force upon the mass which tends to additionally displace the same—in other words an astatic system. Astatically working magnet systems have been tried for this purpose. They were however found to add to the errors encountered and/or the expenses involved, because of geomagnetic influences and the like. For this reason astatic mechanical-optical systems are now preferred, as has been disclosed in greater detail in the present applicant's copending application Serial No. 727,588, filed April 10, 1958, and entitled Gravimeter, which has been assigned to the assignee of the present invention and whereof this is a continuation in part.

Although the system described and claimed in said copending application is capable of measuring gravity very minutely and of eliminating disturbance of magnetic and similar types, it is seriously affected by mechanical influences tending to cause tilting of the instrument, particularly when a high degree of astatic suspension is used in an attempt to provide great amplification of the initial motion caused by a change in gravity. Even in the event that recourse is had to certain tilt-compensating means heretofore used in weighing scales, telescopes, theodolite reading microscopes and the like, that is, to pendulum means which can be combined with an astatic gravimeter indicator in one way or another, serious problems are still encountered.

These remaining problems, which are largely although not exclusively due to dynamic effects incident to tilting processes, have been overcome by the present invention and particularly by astatically connecting a single gravimeter mass with a pair of pendulum elements, having a pair of preferably optical indicator means cooperating therewith. Basic features of such an arrangement have already been disclosed in the said co-pending application; and according to a further aspect of the invention claimed herein the pendulum-indicator means of said pair are optically inter-related with one another in such a way as to minimize or eliminate both static and dynamic tilt effects, while co-operating to astatically influence the single gravimeter mass to some predetermined extent. Certain ways in which these principles can be realized are illustrated in the drawing, wherein:

Figure 2 is a schematic view taken along line 2—2 in Figure 1;

Figure 3 is a perspective view of a detail from Figure 1;

Figure 4 is a schematic view, generally similar to that of Figure 1, of a modified system;

Figure 5 is a schematic view of a further modification; and

Figure 6 is a similar view of still another modification.

Figure 1:
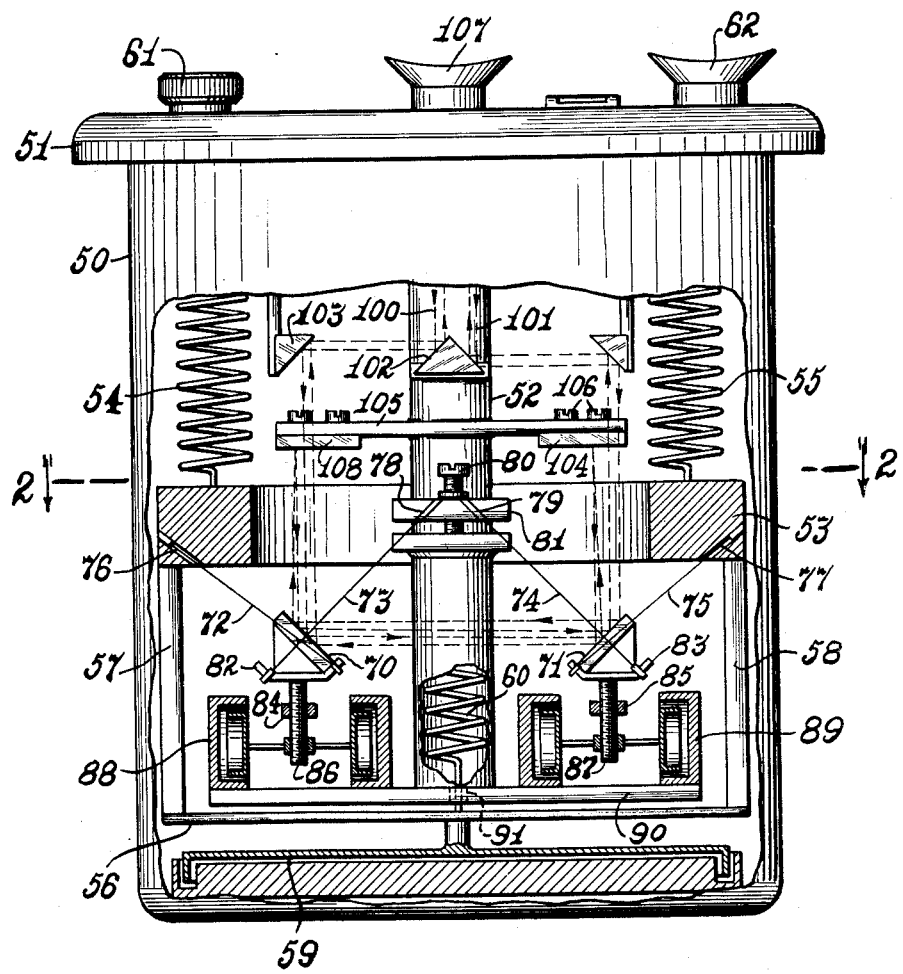
Figure 1 is an elevational view, partly broken away and partly in section, of a preferred instrument in accordance with this invention.
Figure 1:

Referring to Figure 1: the gravimeter housing 50, which desirably is associated with thermostatically controlled means not shown, comprises a base plate 51 having rigidly connected therewith a desirably central, vertical, tubular element 52. The gravimeter mass 53 is ring-shaped and coaxial with the tube 52, thereby assuring a compact arrangement, among other things. The said mass is movably suspended on spring scale means, indicated by the showing of two extension springs 54, 55 the upper ends of which are secured to the base plate 51 and the lower ends to the mass 53 so that the said mass upon a change in gravity can move in the direction of the axes of the springs. Rigidly connected with the ring mass 53 by connector rods 57, 58 is a lower plate 56, supporting well known damping means 59. Coaxially within the hollow tube 52 there is disposed a soft return or zeroing spring 60 having a lower end secured to plate 56 and an upper end suitably connected by means not shown with micrometer adjustment means 61 for measurably returning the gravimeter mass 53 to an original or zero position upon the occurrence of a change in gravity. For reading the position of the micrometer element 61 a reading microscope 62 is provided, the details thereof being omitted as they are known to the art.

In accordance with the invention the gravimeter mass 53 is connected with a pair of pendulum type indicator means shown as reflectors 70, 71 each of which is astatically connected with the mass by a system shown as comprising an articulated quadrilateral of the crossed flexible link type, the suspending links of reflector 70 being shown at 72, 73 and those of reflector 71 at 74, 75; each system having one link or link means 72, 75 connected with the mass at 76, 77 and another, 73, 74, connected with the stationary tube 52 at 78, 79. The links, which may be ribbons or wires or the like, are adjustably secured to their attachment points by adjustment means, one of which is schematically indicated by the screw 80 controlling the vertical position of a carrier 81 for the stationary attachment points 78, 79 of links 73, 74.

The reflectors 70, 71 are preferably formed by prisms also serving as pendulum elements, with mirror means on their inclined front surfaces. These prisms are supported on carrier elements 82, 83 which also serve as anchoring means for the lower ends of the suspending links; and each carrier 82, 83 is shown as having an adjustable weight 84, 85 on a downwardly extending guide means 86, 87. Upward or downward adjustment of these weights allows modification of the center of gravity of each astatic pendulum, thereby modifying in known manner the astatic effect and of course the sensitivity of the device. Damping means for the indicator pendulum devices are also provided as shown at 88, 89; the dash pot chambers of the standing devices being rigid with a plate 90 and thereby with the central stationary tube 52, while the indicator pendulums as mentioned are suspended from that tube and from the movable gravimeter mass. The plate 90 is centrally apertured at 91 in order to allow the aforementioned securement of the return spring 60 to the plate 56 of mass 53.

In further accordance with the invention a pair of light pencils 100, 101 are provided. Two light pencils of generally similar type have already been illustrated in said co-pending application; and in the present instrument as well as in that of said application the arrangement is basically such that identical disturbance, applied to the two pendulum indicator systems due to tilting, cause opposite displacements of the light pencils or pointers. In the present instrument however the two pointers are caused to move not only in opposite directions but in ways interrelated so as to eliminate dynamic as well as static effects of tilting disturbances. This will be understood on consideration of the ray trace of the pointers which can be described as follows with reference to pointer 100.

The said pointer, suitably generated as indicated in the co-pending application or in Figure 6 hereof, reaches a rigidly supported prism 102, having a pair of mirrored surfaces one of which deflects the said pointer via stationary reflector 103 to the reflecting surface of indicator pendulum 70. From here it is reflected to the other indicator pendulum 71 and therefrom to horizontal mirror 104, stationarily mounted on a carrier 105 which may be clamped to the outside of tube 52. A system of screws 106 serves to orient mirror 104 suitably in any of three directions or dimensions, so that light pencil 100 when reflected back to pendulum 71 returns to pendulum 70 along a predetermined path shown by the lowermost arrow, continuing via 103 and 102 to the field of view of a reading device 107, wherein the position of pointer 100 can be compared with a suitable scale not shown.

A similar ray trace is provided for light pencil 101 by the same gravimeter pendulum elements 70, 71 and by a mirror 108 similar to that shown at 104. The relative positions of the optical elements of importance for this system can best be noted from Figure 2 wherein the two mirrors 104 and 108 are shown by broken lines, indexed with opposite ends of indicator prisms 70, 71. It will be understood without discussion or showing of further details that the dimensions and positions of reflectors 70, 71 and associated parts can be chosen so that both light pencils can play between the two reflector surfaces of the pair 70, 71 and between the associated elements as indicated.

In operation, a change of the force of gravity causes vertical displacement of mass 53, thereby causing displacement of indicator pendulum means 70, 71 which supports the displacement of the mass to an extent adjustable by the position of weights 84, 85. The displacement of indicator pendulum 70, 71 causes the light pencils 100 and 101 to move relative to one another—that is toward or away from one another—in the field of view 107, until their normal position relative to one another, preferably their coincidence with one another, has been reestablished by manipulation of micrometer means 61, readable at 62.

During any disturbing, tilting motion of the instrument added displacements occur in the pendulum systems 70, 71. If and as these systems have uniform sensitivity the added displacements lead to no added relative displacements of the light pencils, positions and to no transient displacements of such pencils thereby avoiding the difficulties initially discussed.

The flexible links employed for the suspension of the indicator prisms or not necessarily disposed in mutually crossing ways as shown in Figures 1 and 2. For instance Figure 3 shows a reflector 110 suspended on filaments 111, 112 which do not cross one another. Four such filaments are shown in this figure but simplification is possible and two filaments suffice in certain cases. Frequently however a third or fourth filament is desirable in order to avoid twisting effects disturbing the measurements.

Referring now to the embodiment of Figure 4: a ring-shaped gravimeter mass is again shown, at 113, with reflector pendulum 114, 115 suspended by filaments in ways similar to those used in Figure 1. The arrangement is however modified as to the stabilization of the light pencil ray trace, counteracting the effects of tilting movements; the ray trace of pencil 100' comprising in this case, in addition to prism 102, reflector 103 and prism pendulum 114, a rigidly mounted prism 116; a suspended prism pendulum 116' on flexible filament links 117, 118 arranged in a way similar to those of prism 114; and a vertically mounted mirror 108'. The corresponding arrangement is used for light pencil 101', including a vertical mirror 104'.

Thus it will be seen that in the arrangement of Figure 4 the two light pencils do not play between the two indicator pendulums 114, 115 but they do play between these indicator pendulums and a similarly suspended prism pendulum 116', thereby providing optical effects corresponding to those obtained in Figures 1 and 2 but making the adjustments of the various movable parts relative to one another somewhat less critical.

Still further independence of the several elements from one another is provided in Figure 5 wherein a gravimeter mass 120 suspended on spring 121 has a pair of indicator pendulums 122, 123, suspended in the ways previously described herein. In this case each indicator pendulum and each corresponding light pencil 100'', 101'' cooperates with an independent tilt stabilizing pendulum 124, 125, with the aid of stationary reflectors 126, 127 and of stationary vertical counter mirrors 128, 129 for the return of the rays in the auto-collimator systems.

By means such as those of these last few modifications it is possible to operate with a single indicator pendulum connected with the gravimeter mass. For instance Figure 6 shows a gravimeter mass 120' suspended from spring 121' and having a single indicator pendulum 123' connected therewith in a way similar to that shown in Figure 5. In this case a light pencil 131 generated by a light source 132 and projector system 133 passes via pendulum reflector 123', stationary reflector 134 and tilt stabilizing pendulum reflector 135 to an optical element such as an indicator plate 136, for instance of frosted glass which may be provided with a scale. If the sensitivity of pendulum 135 is adjusted to that of pendulum 123' the arrangement is free of disturbance by static and dynamic effects of tilting of the entire instrument.

The arrangements according to Figures 1 and 6 have the advantage that a minimum number of pendulum means are used. A further advantage of the arrangement according to Figure 1 is that gravimetric sensitivity is particularly high and tilt sensitivity particularly low as a result of features including the particular ray trace of the light pencils utilized in this case. It will however be realized upon a study hereof that tilting compensators and other parts of the invention can be modified in various ways.

I claim:

1. In a gravimeter, a normally stationary but at least minutely tiltable structure; a gravimeter spring having one end secured to said structure; a gravimeter mass supported by the other end of said spring for vertical displacement upon a change of the force of gravity acting on said mass, the spring and mass being subject to other displacements upon any tilting of said structure; and a mechanism for indicating said vertical displacements without disturbance by said other displacements, said mechanism comprising: first and second pendulum bodies, each having at least a pair of spaced suspension points, first and second suspension systems having at least two flexible filaments each, at least one of the filaments of each system being secured to and depending from said structure, at least one of the filaments depending from said mass, the lower ends of the filaments of each system being secured to said suspension points of one of said pendulum bodies, the filaments of the first system being dimensioned and oriented generally similarly to the corresponding filaments of the second system, and indicator means jointly responsive to relative displacements of the suspension points of the so suspended pendulum bodies, said indicator means comprising reflector means on each of said pendulum bodies, a reading device on said structure, and means for directing light over a path which includes at least one portion extending from reflector means of one of said pendulum bodies to reflector means of the other pendulum body for reflection into said reading device.

2. In a gravimeter, a normally stationary but at least minutely tiltable structure; a gravimeter spring having one end secured to said structure; a gravimeter mass supported by the other end of said spring for vertical displacement upon a change of the force of gravity acting on said mass, the spring and mass being subject to other displacements upon any tilting of said structure; and a mechanism for indicating said vertical displacements without disturbance by said other displacements, said mechanism comprising: first and second pendulum bodies, each having at least a pair of spaced suspension points, first and second suspension systems having at least two flexible filaments each, at least one of the filaments of each system being secured to and depending from said structure, at least one of the filaments depending from said mass, the lower ends of the filaments of each system being secured to said suspension points of one of said pendulum bodies, the filaments of the first system being dimensioned and oriented generally similarly to the corresponding filaments of the second system, and indicator means jointly responsive to relative displacements of the suspension points of the so suspended pendulum bodies, said indicator means comprising reflector means on each of said pendulum bodies; a reading device on said structure; reflector means on said mass; and means for directing light over a path which includes at least one portion extending from reflector means on the mass to reflector means of one of said pendulum bodies for reflection into said reading device.

References Cited in the file of this patent

UNITED STATES PATENTS

| | | |
|---|---|---|
| 2,132,865 | Von Thyssen-Bornemisza | Oct. 11, 1938 |
| 2,232,177 | Ide | Feb. 18, 1941 |
| 2,296,330 | Blau | Sept. 22, 1942 |